US010302444B2

(12) United States Patent
Miyajima

(10) Patent No.: US 10,302,444 B2
(45) Date of Patent: May 28, 2019

(54) INFORMATION PROCESSING SYSTEM AND CONTROL METHOD

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/542,720

(22) PCT Filed: Oct. 21, 2015

(86) PCT No.: PCT/JP2015/079708
§ 371 (c)(1),
(2) Date: Jul. 11, 2017

(87) PCT Pub. No.: WO2016/121174
PCT Pub. Date: Aug. 4, 2016

(65) Prior Publication Data
US 2017/0370744 A1 Dec. 28, 2017

(30) Foreign Application Priority Data

Jan. 30, 2015 (JP) .................. 2015-016666

(51) Int. Cl.
*G01C 21/36* (2006.01)
*G01C 21/34* (2006.01)
(Continued)

(52) U.S. Cl.
CPC ......... *G01C 21/3617* (2013.01); *G01C 21/26* (2013.01); *G01C 21/34* (2013.01);
(Continued)

(58) Field of Classification Search
CPC .. G01C 21/3617; G01C 21/343; G01C 21/26; G01C 21/34; G05D 1/0088; G06Q 10/101; G06Q 50/10; G09B 29/007
See application file for complete search history.

(56) References Cited

U.S. PATENT DOCUMENTS

| 9,658,620 | B1 * | 5/2017 | Urmson | G05D 1/0088 |
| 2009/0318777 | A1 * | 12/2009 | Kameyama | A61B 5/16 |
| | | | | 600/301 |
| 2014/0309933 | A1 * | 10/2014 | Shin | G01C 21/3484 |
| | | | | 701/533 |

FOREIGN PATENT DOCUMENTS

| JP | 2008-003027 A | 1/2008 |
| JP | 2009-036653 A | 2/2009 |

(Continued)

OTHER PUBLICATIONS

Yamada, JP 2010237134, Oct. 21, 2010 (machine translation).*

(Continued)

*Primary Examiner* — Courtney D Heinle
(74) *Attorney, Agent, or Firm* — Chip Law Group

(57) ABSTRACT

Provided is an information processing system and a control method which are capable of generating more optimal guidance information in view of a relationship of a plurality of users. The information processing system includes a user specifying unit configured to specify a plurality of users who are performing an action together; an estimating unit configured to estimate a relationship of the plurality of specified users; and a generating unit configured to generate guidance information for the plurality of users in accordance with the estimated relationship of the plurality of users.

16 Claims, 13 Drawing Sheets

(51) Int. Cl.
  *G05D 1/00*      (2006.01)
  *G01C 21/26*     (2006.01)
  *G06Q 10/10*     (2012.01)
  *G09B 29/00*     (2006.01)
  *G06Q 50/10*     (2012.01)

(52) U.S. Cl.
  CPC ......... *G01C 21/343* (2013.01); *G05D 1/0088* (2013.01); *G06Q 10/101* (2013.01); *G09B 29/007* (2013.01); *G06Q 50/10* (2013.01)

(56) References Cited

FOREIGN PATENT DOCUMENTS

| | | |
|---|---|---|
| JP | 2009-36653 A | 2/2009 |
| JP | 2010-237134 A | 10/2010 |
| JP | 2011-117905 A | 6/2011 |
| JP | 2013-088409 A | 5/2013 |
| JP | 2013-88409 A | 5/2013 |
| JP | 2013-164664 A | 8/2013 |
| WO | 2014/006688 A1 | 1/2014 |
| WO | 2014/054152 A1 | 4/2014 |

OTHER PUBLICATIONS

Hachisuga et al., JP 2013164664, Aug. 22, 2013 (machine translation).*

International Search Report and Written Opinion of PCT Application No. PCT/JP2015/079708, dated Jan. 26, 2016, 02 pages of English Translation and 07 pages of ISRWO.

* cited by examiner

ENVIRONMENTAL INFORMATION MAP IN WHICH FILTERING IS PERFORMED
ACCORDING TO "COUPLE-ORIENTED"
AND "RAIN, TEMPERATURE OF 18 DEGREES, 9:00 PM"
AROUND BASE ROUTE TO FINAL DESTINATION

FIG.9

| OBJECT ID | NAME | TYPE | ATTRIBUTE 1 | ATTRIBUTE 2 | ATTRIBUTE 3 |
|---|---|---|---|---|---|
| 384 | AAA | PERSON | AGE: 32 | SEX: MALE | OCCUPATION: COMPANY EMPLOYEE |
| 5505 | ○○○○ | RESTAURANT | CATEGORY: ITALIAN | BUSINESS HOURS: 11:30 TO 23:00 CLOSED ON MONDAYS | SEATS: 38 |
| 465 | BBB | PERSON | AGE: 45 | SEX: FEMALE | OCCUPATION: HOUSEWIFE |
| 9210 | ◇◇◇◇ | BAR | CATEGORY: CAFE BAR | BUSINESS HOURS: 18:00 TO 02:00 OPEN THROUGHOUT YEAR | SEATS: 16 |
| 678 | CCC | PERSON | AGE: 27 | SEX: MALE | OCCUPATION: COMPANY MANAGEMENT |
| ... | | | | | |

FIG.10

| OBJECT ID | DATE AND TIME /PERIOD/LOCATION | ASSOCIATED OBJECT ID | INTERACTION TYPE | DETAILS | EVALUATION (−1.0~1.0) |
|---|---|---|---|---|---|
| 465 (PERSON) | 2013/06/21 1-2-3, ○○ CITY, ○○ PREFECTURE | 5505 (RESTAURANT) | MEAL IS PROVIDED | FOOD: BEST HOSPITALITY: COURTEOUS ATMOSPHERE: GOOD | 0.85 |
| 384 (PERSON) | 2013/09/14 1-2-3, ○○ CITY, ○○ PREFECTURE | 5505 (RESTAURANT) | MEAL IS PROVIDED | FOOD: GOOD HOSPITALITY: COURTEOUS ATMOSPHERE: AVERAGE | 0.72 |
| ⋮ | | | | | |
| 784 (PERSON) | 2013/08/11 1-3-4, ◇◇ CITY, ○○ PREFECTURE | 9210 (BAR) | ALCOHOL IS PROVIDED | FOOD: AVERAGE HOSPITALITY: BAD ATMOSPHERE: BAD | 0.22 |
| 678 (PERSON) | 2014/05/29 1-3-4, ◇◇ CITY, ○○ PREFECTURE | 9210 (BAR) | ALCOHOL IS PROVIDED | FOOD: BAD HOSPITALITY: AVERAGE ATMOSPHERE: AVERAGE | 0.30 |

FIG.11

| OBJECT ID | DATE AND TIME PERIOD/LOCATION | ASSOCIATED OBJECT ID | INTERACTION TYPE | DETAILS | EVALUATION (-1.0~1.0) |
|---|---|---|---|---|---|
| 384 (PERSON) | 2000/06/21 00.1245, 10.12345 02.1245, 11.12345 ... | 18000555 (VEHICLE) | DRIVING | ACCELERATOR OPERATION: ROUGH BRAKE OPERATION: SUDDEN HANDLE OPERATION: FAST | 0.2 |
| 384 (PERSON) | 2000/06/21 02.1255, 11.12355 | 204555 (CHAIR) | THROWING | HIT AND WOUNDED | -0.8 |
| ... | | | | | |
| 465 (PERSON) | 2010/08/11 12.11345, 12.11345 | 1930213 (CLOCK) | HANDLING | CLEANING | 0.9 |
| 465 (PERSON) | 2010/08/11 12.11345, 12.11345 | 1930213 (CLOCK) | STORAGE | DUST: LITTLE AVERAGE HUMIDITY: 18% | 0.9 |
| ... | | | | | |

INTEGRATED HEAT MAP

INFORMATION PROCESSING SYSTEM AND CONTROL METHOD

CROSS REFERENCE TO RELATED APPLICATIONS

This application is a U.S. National Phase of International Patent Application No. PCT/JP2015/079708 filed on Oct. 21, 2015, which claims priority benefit of Japanese Patent Application No. JP 2015-016666 filed in the Japan Patent Office on Jan. 30, 2015. Each of the above-referenced applications is hereby incorporated herein by reference in its entirety.

TECHNICAL FIELD

The present disclosure relates to an information processing system and a control method.

BACKGROUND ART

In the past, navigation systems that automatically search for and provide guidance on a route to a designated destination have been proposed. Such a navigational system searches for a route with the shortest travel distance and time from a current location to a designated destination and presents the user with a search result or provides the user with route guidance based on the search result.

For example, with respect to a technique of such a navigation system, a navigation device that proposes a stopover spot on the basis of a preference of the user and a recommendation degree of facility information is disclosed in Patent Literature 1.

CITATION LIST

Patent Literature

Patent Literature 1: JP 2008-3027A

DISCLOSURE OF INVENTION

Technical Problem

However, in the navigation system of the related art, since only the route to the designated destination is searched for, it was necessary for the user to search for other stopover spots near the route.

On the other hand, in the navigational device disclosed in Patent Literature 1, stopover spots are proposed from facilities of genres corresponding to the degree of preference of the user, but optimal route guidance when there are a plurality of users is not mentioned.

In this regard, in the present disclosure, an information processing system and a control method which are capable of generating more optimal guidance information in view of a relationship of a plurality of users are proposed.

Solution to Problem

According to the present disclosure, there is provided an information processing system, including: a user specifying unit configured to specify a plurality of users who are performing an action together; an estimating unit configured to estimate a relationship of the plurality of specified users; and a generating unit configured to generate guidance information for the plurality of users in accordance with the estimated relationship of the plurality of users.

According to the present disclosure, there is provided a control method, including: specifying a plurality of users who are performing an action together; estimating a relationship of the plurality of specified users; and generating guidance information for the plurality of users in accordance with the estimated relationship of the plurality of users.

Advantageous Effects of Invention

As described above, according to the present disclosure, it is possible to generate more optimal guidance information in view of a relationship of a plurality of users.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is a diagram illustrating an example of detailed object information stored in an object DB according to the present embodiment.

FIG. 10 is a diagram illustrating an example of interaction information extracted from an emotional information DB according to the present embodiment.

FIG. 11 is a diagram illustrating an example of interaction information extracted from an emotional information DB according to the present embodiment.

MODE(S) FOR CARRYING OUT THE INVENTION

Figure 1:
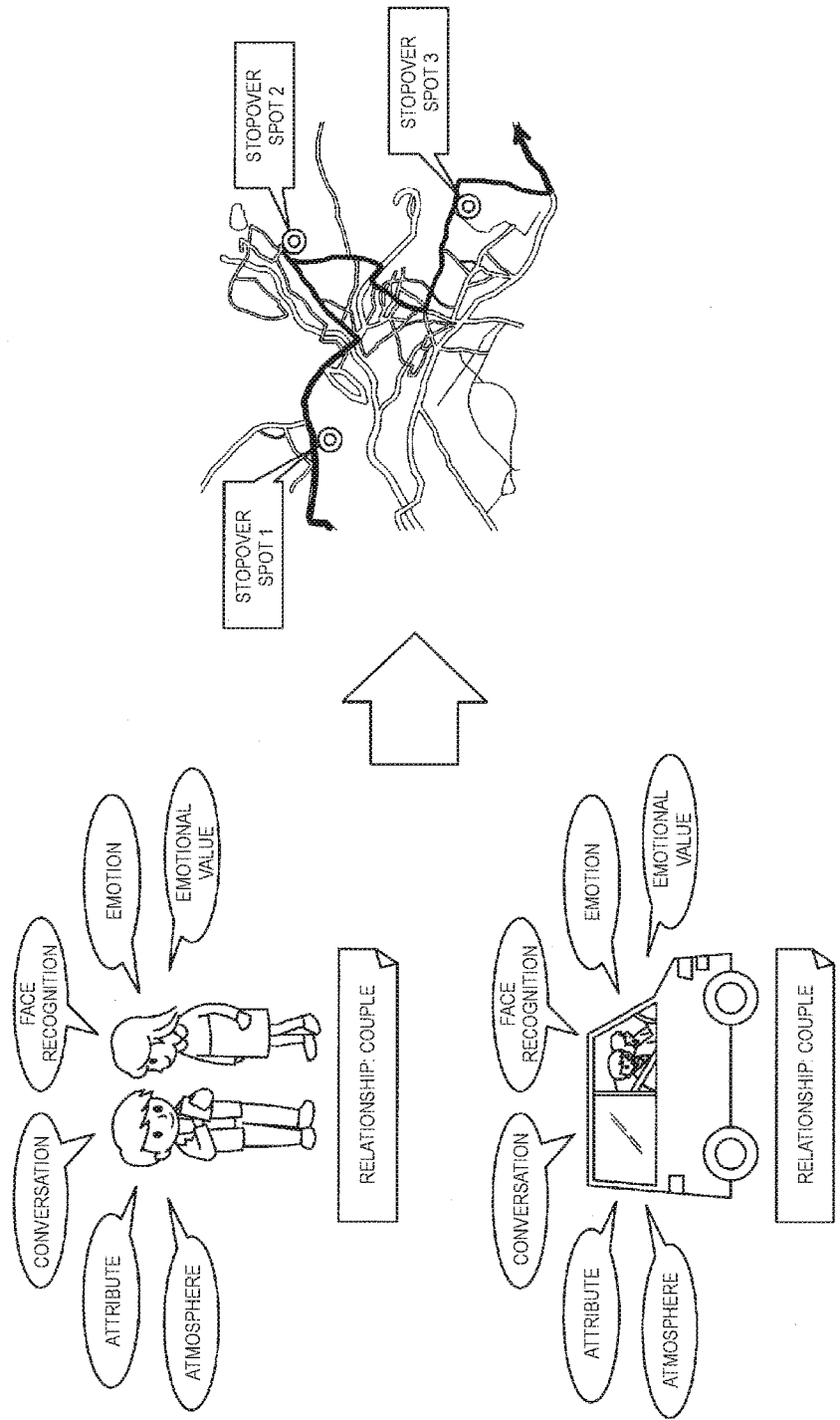
FIG. 1 is a diagram illustrating an overview of an information processing system according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, the description will proceed in the following order.

1. Overview of the information processing system according to one embodiment of the present disclosure
2. Basic configuration
2-1. Configuration of guide server
2-2. Configuration of vehicle
2-3. Configuration of emotion server
3. Operation process
4. Conclusion Overview of Information Processing System According to one Embodiment of Present Disclosure First, an overview of an information processing system according to one embodiment of the present disclosure will be described with reference to FIG. 1. The information processing system according to the present embodiment estimates a relationship of a plurality of users from an atmosphere, an attribute, a conversation, face recognition, an emotion, an emotional value, or the like of a plurality of users based on information acquired from various kinds of sensors, and presents guidance information suitable for the estimated relationship. The guidance information to be presented is information of a route to a destination or information of a route through a stopover spot in the middle of the route (for example, information of a route to a destination through a stopover spot 1, a stopover spot 2, and a stopover spot 3 illustrated on the right in FIG. 1). Further, the presentation of the guidance information may be performed by display output or audio output in an information processing terminal owned by the user (for example, a smartphone, a mobile phone terminal, a tablet terminal, a wearable terminal, or the like) or may be performed by display output or audio output in a vehicle in which the user is riding. Further, when the vehicle in which the user is riding is an autonomous cruising vehicle, autonomous cruising according to route information serving as guidance information may be performed.

(Background)

Here, in the navigational system of the related art, a route having a shortest time/distance to a destination input by the user is automatically searched for, and navigation according to the route is performed. On the other hand, generally, when there is enough time to travel to the destination in travels or the like, the user is assumed to stop at a sightseeing spot, a restaurant, a souvenir shop, and the like while moving to the destination. However, as described above, in the navigation system of searching for and presenting only the route to the destination, the user has to search for a stopover spot along the route and set the stopover spot as a new destination again. The search for the stopover spot is a burdensome task on the user, and an optimal place is difficult to sufficiently search for depending on search ability of the user.

Further, when there are a plurality of users, optimal navigation is assumed to differ depending on a relationship of the plurality of users. For example, in the case of a family, a route including stopping at a family-oriented spot is optimal, but in the case of a couple, a route including stopping at a couple-oriented spot is optimal. Further, in the case of a business relationship, a route that arrives at a destination with the shortest distance without stopping is optimal.

In this regard, in light of the above points, in the information processing system according to the present disclosure, it is possible to generate more optimal guidance information in view of a relationship of a plurality of users. Specifically, in the information processing system according to the present embodiment, a stopover spot near a route to a designated destination according to a relationship of a plurality of users is automatically searched for, and guidance information including the stopover spot is generated and presented to the user.

Examples of a relationship of users include a couple, friends, family members, spouses, a parent and child, siblings, and a business relationship which are illustrated in FIG. 1. A relationship of a plurality of users can be estimated from an atmosphere, an attribute, a conversation, face recognition, an emotion, an emotional value, or the like of a plurality of users based on information obtained from various kinds of sensors as described above.

More specifically, in the information processing system according to the present embodiment, for example, sexes and rough ages of a plurality of users are estimated on the basis of captured images of faces of the users captured by a camera of an information processing terminal or an in-vehicle camera of a vehicle, audio data of the users collected by a microphone, and biometric information of the users detected by a biosensor, and a relationship is estimated from a combination of the sexes and the rough ages of the users. In the information processing system according to the present embodiment, it is also possible to estimate the atmosphere on the basis of analysis of conversational content based on the audio data, voice tones, facial expression recognition based on the captured image, the biometric information, and the like and estimate the relationship from the atmosphere.

Further, the information processing system according to the present embodiment can also perform individual identification of a plurality of users with reference to person information which is registered in advance using face recognition based on a captured image, speaker recognition based on audio data, or biometric authentication based on biometric information. In this case, it is possible to acquire an attribute (an age, a sex, an occupation, or the like) which is registered to be associated with an identified person in advance and estimate a relationship of a plurality of users in accordance with the attribute.

Further, when the individual identification is performed, it is possible to estimate an emotional value of a plurality of users on the basis of object IDs registered to be associated with identified persons in advance and estimate a relationship of a plurality of users in accordance with the emotional values. In this specification, the emotional value is an index which is calculated on the basis of an evaluation value of an interaction that occurs between a plurality of objects including a person or an object and is accumulated (an action occurring between objects such as object handling, caring, service provision, and a conversation) and obtained by quantifying a nature, character, and a personality of an object. For example, a person with a low emotional value can be determined to be a person with low reliability, a person who handles objects carelessly, or a boorish person, and a person with a high emotional value can be determined to be a person with high reliability, a person who handles objects with care, or a good person. Further, when the emotional value is calculated, an evaluation value of an interaction accumulated in association with an object ID of a target is used, but a range of an interaction history to be used differs depending on the use purpose of the emotional value. For example, when the emotional value is used to estimate a relationship of a plurality of users according to the present embodiment, the emotional value is calculated using an evaluation value of a previous interaction that has occurred among a plurality of users using object IDs corresponding to a plurality of specified users. Accordingly, it is possible to estimate a more detailed relationship of a plurality of users (for example, a couple is bickering).

The overview of the information processing system according to one embodiment of the present disclosure has been described above. Next, an overall configuration of the information processing system according to the present embodiment will be described with reference to FIG. 2.

Figure 2:
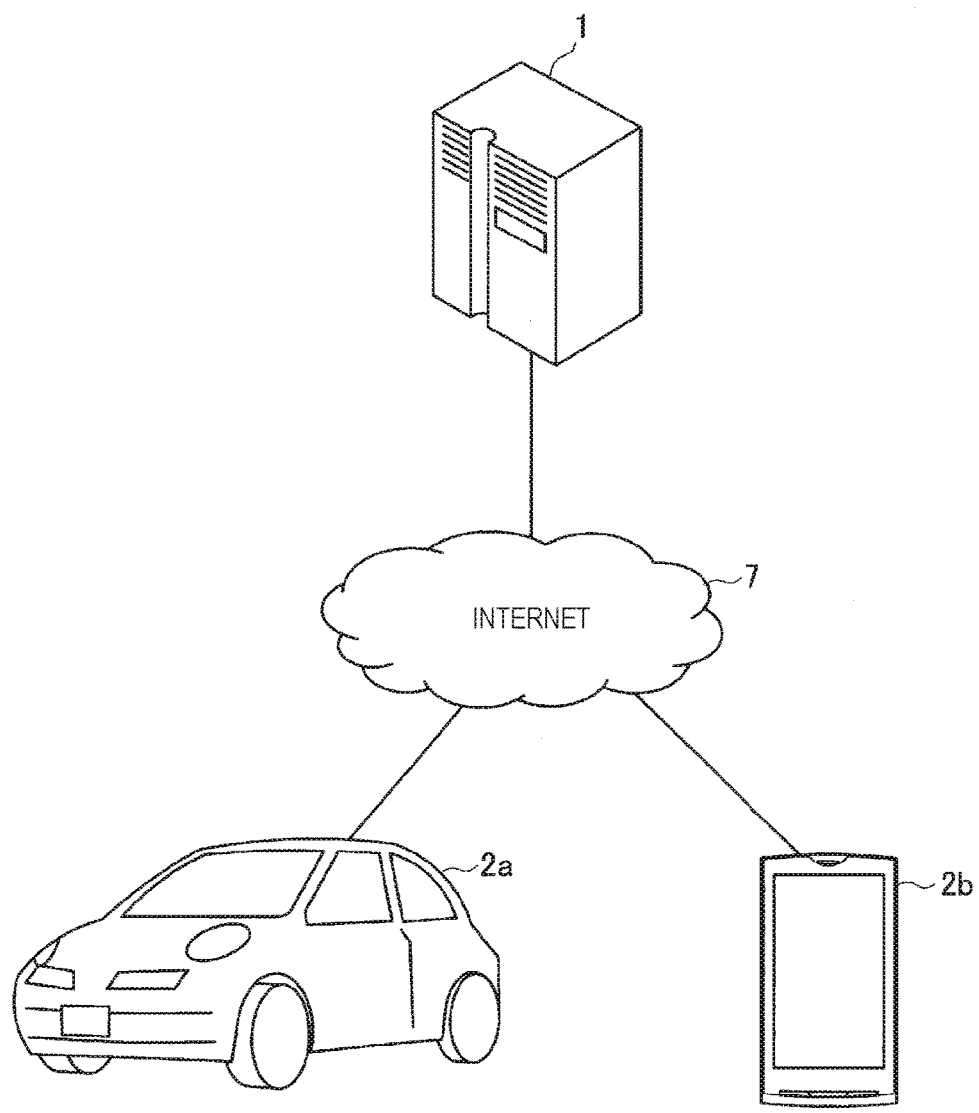
FIG. 2 is a diagram illustrating an overall configuration of an information processing system according to the present embodiment.

FIG. 2 illustrates the overall configuration of the information processing system according to the present embodiment. As illustrated in FIG. 2, the information processing system according to the present embodiment includes a guide server 1 that generates guidance information and an information processing device (for example, a vehicle 2a or a smartphone 2b) that presents the user with the guidance information received from the guide server 1. The guide server 1 is connected with the vehicle 2a or the smartphone 2b, for example, via the Internet 7 as illustrated in FIG. 2. Hereinafter, the vehicle 2a is used as an information processing device that presents the guidance information.

The guide server 1 estimates a relationship of a plurality of users who are riding in the vehicle 2a and generates the guidance information in accordance with the estimated relationship. A relationship of a plurality of users is estimated on the basis of information about the users which is detected by the sensor and transmitted from the vehicle 2a (for example, a captured image, audio data, biometric information, or the like). The guidance information may include, for example, information of a route to a designated destination and stopover spot information according to the estimated relationship as described above. Specifically, for example, when a plurality of users are a couple, a couple-oriented spot is included as the stopover spot information, and when a plurality of users are a family, a family-oriented spot is included as the stopover spot information.

The guide server 1 transmits the generated guidance information to the vehicle 2a via the Internet 7. The vehicle 2a displays the received guidance information on a display device (for example, a car navigation device) installed in the vehicle 2a or presents the user with the received guidance information through a voice output from a speaker. Further, when the vehicle 2a is an autonomous cruising vehicle, control is performed such that autonomous cruising is performed in accordance with the route information included in the received guidance information. Accordingly, the passenger of the vehicle 2a can travel to a destination via a suitable stopover spot according to the relationship and enjoy traveling and driving more.

Further, the guidance information generated by the guide server 1 is not limited to automobile navigation information for the vehicle 2a and may be navigational information for traveling by foot, bicycle, train, or bus.

The overall configuration of the information processing system according to the present embodiment has been described above. Next, a basic configuration of each device included in the information processing system of the present embodiment will be explained in detail.

2. Basic Configuration

<<2-1. Guide Server>

Figure 3:
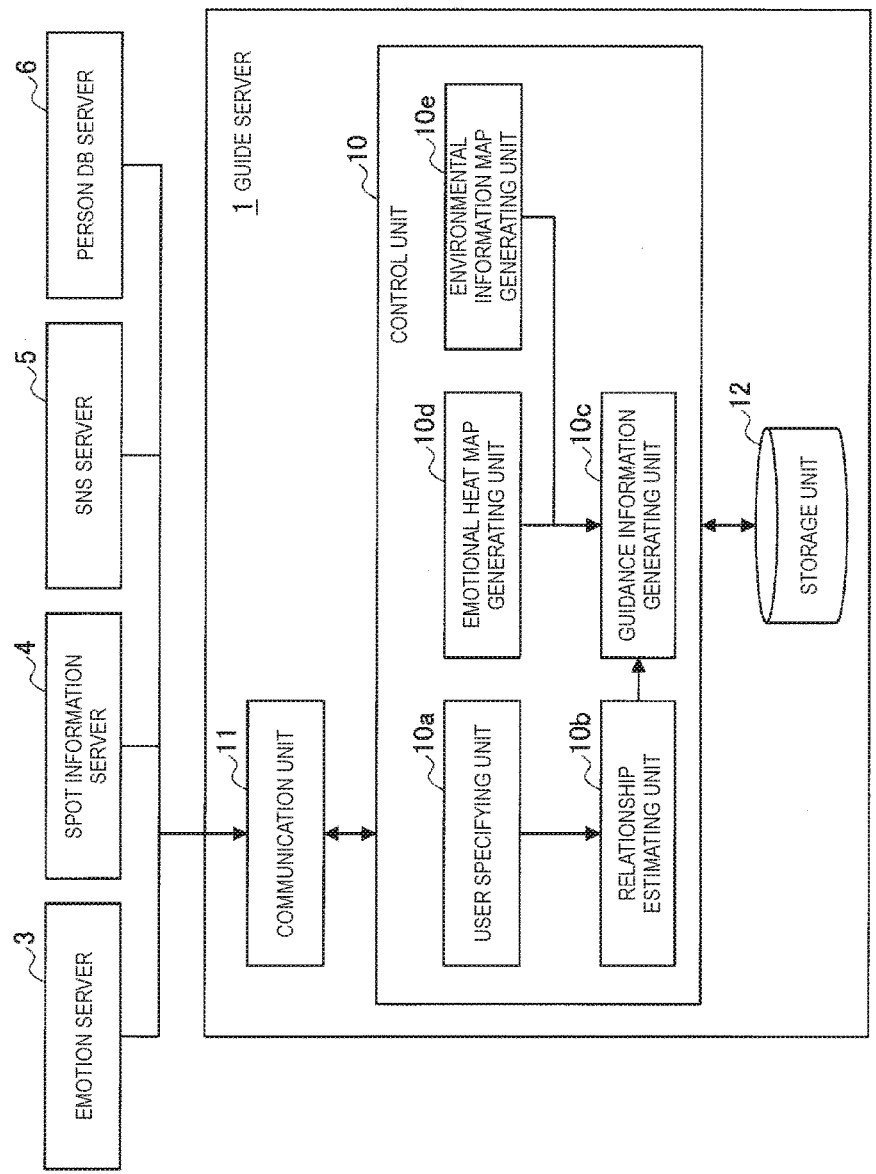
FIG. 3 is a block diagram illustrating an example of a configuration of a guide server according to the present embodiment.

FIG. 3 is a block diagram illustrating an example of a configuration of guide server 1 according to the present embodiment. As illustrated in FIG. 3, the guide server 1 according to the present embodiment includes a control unit 10, a communication unit 11, and a storage unit 12.

(Control Unit)

The control unit 10 controls the respective components of the guide server 1. The control unit 10 is implemented by a microcomputer including a central processing unit (CPU), a read only memory (ROM), a random access memory (RAM), and a non-volatile memory. The control unit 10 according to the present embodiment also functions as a user specifying unit 10a, a relationship estimating unit 10b, a guidance information generating unit 10c, an emotional heat map generating unit 10d, and an environmental information map generating unit 10e as illustrated in FIG. 3.

The user specifying unit 10a specifies a plurality of users who are riding in the vehicle 2a (performing an action together) on the basis of information related to the users which is detected by a sensor and received from the vehicle 2a via the communication unit 11. Examples of the information related to the users detected by the sensor include a captured image of the users captured by an in-vehicle camera installed in the vehicle 2a, audio data of the users collected by a microphone, and biometric information of the users detected by a biosensor (for example, a heart rate, a sweating rate, brain waves, a body motion, a fingerprint, or the like). The information about the users may also include inter-terminal communication data. The inter-terminal communication data refers to identification information of the users (a name, an age, a sex, a user ID, and the like) which can be acquired by the vehicle 2a through communication (infrared communication, Wi-Fi (registered trademark), Bluetooth (registered trademark), or the like) with an information processing terminal of the user (a smartphone, a mobile phone terminal, a tablet terminal, a wearable terminal, or the like).

The user specifying unit 10a analyzes a facial image, audio data, and biometric information of the passengers and performs estimation of sexes and rough ages of the passengers (the plurality of users) and individual identification when possible. The individual identification is performed with reference to an analysis result of the facial image or the like and the person information previously registered in a person DB server 6. Further, the individual identification may be performed with reference to the person information acquired from a social networking service (SNS) server 5. The user specifying unit 10a may newly register person information (a sex, a rough age, a name, a hobby/preference, an occupation, things they dislike, or the like) acquired by performing facial image analysis, voice recognition, conversation recognition, biometric recognition, or the like on a person who is unable to be identified in the person DB server 6. When an animal other than a human who performs an action together with the user is specified, the user specifying unit 10a may register animal information in which the type of animal (dog, cat, etc.) is allocated as an attribute in the person DB. The user specifying unit 10a may also specify a plurality of users on the basis of manually input information when the user riding in the vehicle 2a manually inputs information about the passengers, and the information is transmitted from the vehicle 2a. The user specifying unit 10a outputs the information about a plurality of specified users to the relationship estimating unit 10b.

The relationship estimating unit 10b estimates a relationship of a plurality of users specified by the user specifying unit 10a. For example, the relationship estimating unit 10b estimates a parent-child relationship, a sibling relationship, a friend relationship, a couple relationship, or the like on the basis of or a combination of sexes or rough ages of a plurality of users specified by the user specifying unit 10a. The relationship estimating unit 10b can also estimate a relationship of a plurality of users by setting a plurality of relationship candidates based on a combination of sexes or rough ages and further analyzing and recognizing conversational content on the basis of audio data.

Further, the relationship estimating unit 10b can acquire the atmosphere in the vehicle by recognizing a facial expression based on a facial image, analyzing and recognizing conversational content based on the audio data, and analyzing a voice tone or biometric information, and estimate a relationship of a plurality of users on board in accordance with the acquired atmosphere.

Further, the relationship estimating unit 10b can also estimate a relationship of a plurality of users on the basis of information related to emotions of the plurality of users. The information related to the emotions can be acquired, for example, by facial expression recognition based on a facial image, analysis and recognition of conversational content based on audio data, a voice tone, or the biometric information.

Further, when the individual identification of a plurality of users is able to be performed, the relationship estimating unit 10b may acquire the emotional values of the users from an emotion server 3 as the information related to the emotions of a plurality of users and estimate a relationship of a plurality of users on the basis of the emotional value. Specifically, the relationship estimating unit 10b acquires the object IDs of a plurality of identified users from the person DB server 6 and requests the emotion server 3 to transmit the emotion value using the object ID. The emotion server 3 transmits the emotional values of objects calculated using an evaluation value of a previous interaction between designated objects in response to the request.

Further, when the individual identification of a plurality of users is able to be performed, the relationship estimating unit 10b can also estimate a relationship of a plurality of users in accordance with attributes of a plurality of users included in the person information acquired from the person DB server 6 (a sex, an age, a name, an occupation, or the like).

The relationship estimating unit 10b outputs the estimated relationship of the plurality of users to the guidance information generating unit 10c. There may be several types of relationships in the vehicle 2a, but in this case, the relationship estimating unit 10b may select a relationship having the largest number of persons. For example, when five users (specifically, a total of five persons including four family members and one child's friend) are riding in the vehicle 2a, two persons are friends, two persons are siblings, two persons are husband and wife, and four persons are in a family relationship, the relationship estimating unit 10b selects the family relationship having the largest number of persons as a relationship of a plurality of users who are riding in the vehicle 2a. The relationship estimating unit 10b may also select a relationship of a person having the strongest power of influence among a plurality of users such as the owner of the vehicle 2a or the oldest person. Further, the relationship estimating unit 10b may estimate a relationship of a plurality of users on the basis of manually input information when the user riding in the vehicle 2a manually inputs information related to a relationship, and the information is transmitted from the vehicle 2a.

The guidance information generating unit 10c generates the guidance information for a plurality of users in accordance with a relationship of a plurality of users estimated by the relationship estimating unit 10b. For example, the guidance information generating unit 10c extracts one or more stopover spots corresponding to a relationship of a plurality of users near a route to a designated destination and generates route information through the stopover spot as the guidance information. Specifically, the guidance information generating unit 10c extracts a family-oriented spot as a stopover spot when a plurality of users have a family relationship, and extracts a couple-oriented spot as a stopover spot when a plurality of users have a couple relationship.

Further, the guidance information generating unit 10c may generate the guidance information optimal for a relationship of a plurality of users using an emotional heat map generated by the emotional heat map generating unit 10d and an environmental information map generated by the environmental information map generating unit 10e. The generation of the guidance information using the emotional heat map and the environmental information map will be described later with reference to FIGS. 7 to 12.

The emotional heat map generating unit 10d generates the emotional heat map in which the information related to the emotion is associated with a position in a map form. The information related to the emotion includes a sensor value detected by a biosensor or the like or an emotional value acquired from the emotion server 3. In the interaction information accumulated in the emotion server 3, location information can be associated in addition to a date and time of each interaction (see FIGS. 10 and 11), and an emotional value based on a history of an interaction performed in an area around a route to a destination or an emotional value of a spot (stopover spot) can be calculated. The generation of the emotional heat map will be described later in detail with reference to FIGS. 8 to 11.

The environmental information map generating unit 10e generates the environmental information map in which environment-related information is associated with a position in a map form. The environment-related information includes spot information (information of sightseeing sites, restaurants, shops, rest stops, parks, and the like) acquired from a spot information server 4. The spot information stored in the spot information server 4 includes information indicating a type of spot related to a relationship of users (a family-oriented spot, a couple-oriented spot, a friend-oriented spot, a large-group-oriented spot, or the like) and feature information of a spot (a spot having a beautiful night view, a spot in which infants are allowed, a terrace seat, a spot in which pets are allowed, and a spot that children can enjoy) in addition to basic information such as a location of each spot, business hours, admission fees, and the like. Further, the environmental information map generating unit 10e extracts spots matching filter conditions such as a relationship of a plurality of users, an attribute (an age, a sex, a hobby/preference, or the like), a time, weather, or a spot category in a predetermined range around the base route in accordance with an instruction from the guidance information generating unit 10c and generates the environmental information map. The generation of the environmental information map will be described later in detail with reference to FIG. 7.

(Communication Unit)

The communication unit 11 performs transmission and reception of data with an external device. For example, the communication unit 11 is connected to the emotion server 3, the spot information server 4, the SNS server 5, and the person DB server 6 and performs transmission and reception of various kinds of data. The communication unit 11 is connected to the vehicle 2a, and receives information about the user detected by a sensor from the vehicle 2a or navigational setting information (a destination, a desired arrival time, selection of a preferred road, or the like) or transmits the guidance information generated by the guidance information generating unit 10c to the vehicle 2a.

(Storage Unit)

The storage unit 12 stores programs for performing various kinds of processes through the control unit 10. The storage unit 12 may also store the emotional heat map generated by the emotional heat map generating unit 10d and the environmental information map generated by the environmental information map generating unit 10e.

The configuration of the guide server 1 has specifically been described above. The configuration of the guide server 1 illustrated in FIG. 3 is an example, and the configuration of the guide server 1 according to the present embodiment is not limited thereto. For example, the spot information stored in the spot information server 4 and the person information stored in the person DB server 6 may be stored in a storage area in the guide server 1, that is, the storage unit 12.

<2-2. Configuration of Vehicle>

Figure 4:
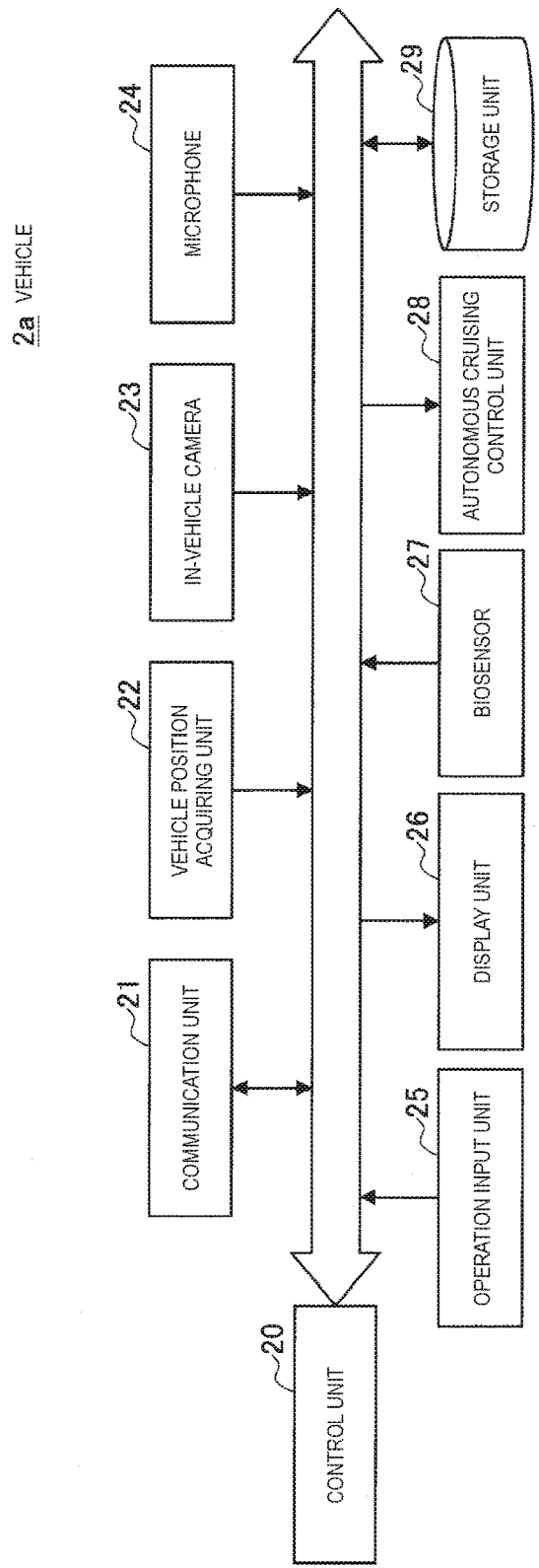
FIG. 4 is a block diagram illustrating an example of a configuration of a vehicle according to the present embodiment.

Next, a configuration of the vehicle 2a which is an example of an information processing device that presents the user with the guidance information will be described. FIG. 4 is a block diagram illustrating an example of the configuration of the vehicle 2a according to the present embodiment. As illustrated in FIG. 4, the vehicle 2a has a control unit 20, a communication unit 21, a vehicle position acquiring unit 22, an in-vehicle camera 23, a microphone 24, an operation input unit 25, a display unit 26, a biosensor 27, an autonomous cruising control unit 28, and a storage unit 29.

(Control Unit)

The control unit 20 is implemented by, for example, a microcomputer including a CPU, a ROM, a RAM, a non-volatile memory, and an interface unit, and controls the components of the vehicle 2a. The control unit 20 performs control such that the captured image captured by the in-vehicle camera 23, the audio data collected by the microphone, or the biometric information detected by the biosensor 27 is transmitted to the guide server 1 as information related to the passenger detected by the sensor through the communication unit 21. The control unit 20 may also perform control such that the identification information of the passenger (a sex, an age, a name, a hobby/preference, a user ID, an object ID, or the like) input from the operation input unit 25 is transmitted to the guide server 1. The control unit 20 may also perform control such that the navigation setting information input from the operation input unit 25, specifically, information related to a destination, a desired arrival time, a preferred road, or the like is transmitted to the guide server 1.

Further, the control unit 20 may perform control such that the guidance information received from the guide server 1 through the communication unit 21 is displayed on the display unit 26 or is output from a speaker (not illustrated) in a voice output manner. The control unit 20 may also instruct the autonomous cruising control unit 28 to autonomously cruise to the route contained in the guidance information received from the guide server 1.

(Communication Unit)

The communication unit 21 performs transmission and reception of data with the external device. For example, the communication unit 21 is connected to the guide server 1, and transmits the information related to the passenger detected by the sensor or the navigational setting information or receives the guidance information generated by the guide server 1.

(Vehicle Position Acquiring Unit)

The vehicle position acquiring unit 22 has a function of detecting a current position of the vehicle 2a on the basis of an acquisition signal from the outside. Specifically, for example, the vehicle position acquiring unit 22 is implemented by a Global Positioning System (GPS) unit, and receives radio waves from GPS satellites, detects the position of the vehicle 2a, and outputs the detected position information to the control unit 20. Further, the vehicle position acquiring unit 22 may detect the position through, for example, transmission and reception with Wi-Fi (registered trademark) or Bluetooth (registered trademark) or near-field communication or the like in addition to the GPS.

(In-Vehicle Camera)

The in-vehicle camera 23 is a camera that images the inside of the vehicle 2a, for example, faces of passengers sitting on respective seats. A location of the in-vehicle camera 23 and the number of in-vehicle cameras 23 are not particularly limited.

(Microphone)

The microphone 24 has a function of collecting sound inside the vehicle 2a, for example, a conversation of the passengers. A location of the microphone 24 and the number of microphones 24 are not particularly limited.

(Operation Input Unit)

The operation input unit 25 accepts an input of the user operation and outputs input information to the control unit 20. For example, the operation input unit 25 may be a touch panel integrated with the display unit 26 installed near a driver seat of the vehicle 2a. Further, the operation input unit 25 may analyze the captured image of the user imaged by the in-vehicle camera 23 to enable a gesture input or analyze the voice of the user collected by the microphone 24 to enable a voice input.

(Display Unit)

The display unit 26 displays a menu screen or a navigation screen and is implemented by, for example, a liquid crystal display. Further, the display unit 26 is installed near the driver seat. The display unit 26 also displays the guidance information transmitted from the guide server 1. The display unit 26 may also be implemented by a projection unit that projects an image onto a front glass of the vehicle 2a.

(Biosensor)

The biosensor 27 detects the biometric information of the user riding in the vehicle 2a. For example, one or more biosensors 27 may be installed in a handle portion of the vehicle 2a, a knob portion of a door, a window open/close manipulation portion, a seat portion, a headrest portion, or the like and detects a body temperature, a perspiration amount, a heart rate, brain waves, a fingerprint, or the like of the passenger.

(Autonomous Cruising Control Unit)

The autonomous cruising control unit 28 has a function of controlling travel of the vehicle 2a and implementing automatic driving that does not depend on an operation of the driver. Specifically, the autonomous cruising control unit 28 controls the vehicle 2a such that the vehicle 2a travels in accordance with the guidance information received from the guide server 1. When the guidance information is guidance of a route to a destination through a stopover spot, the autonomous cruising control unit 28 controls the vehicle 2a such that the vehicle 2a travels along the route through the stopover spot indicated by the guidance information. Further, when autonomous cruising is performed, the autonomous cruising control unit 28 performs accelerator control, brake control, hand control, and the like of the vehicle 2a in accordance with an acquired outside situation (for example, a captured image of a surrounding area, object detection information, and the like).

(Storage Unit)

The storage unit 29 stores programs for performing processes through the control unit 20. The storage unit 29 may also store the information related to the passenger of the vehicle 2a and the guidance information transmitted from the guide server 1.

The specific configuration of the vehicle 2a according to the present embodiment has been described above. The configuration of the vehicle 2a illustrated in FIG. 4 is an example, and the present embodiment is not limited thereto. For example, the autonomous cruising control unit 28 may not be provided, and any other sensor (for example, an infrared camera, a depth camera, or the like) that acquires the information related to the passenger may be installed.

<2-3. Configuration of Emotion Server>

Figure 5:
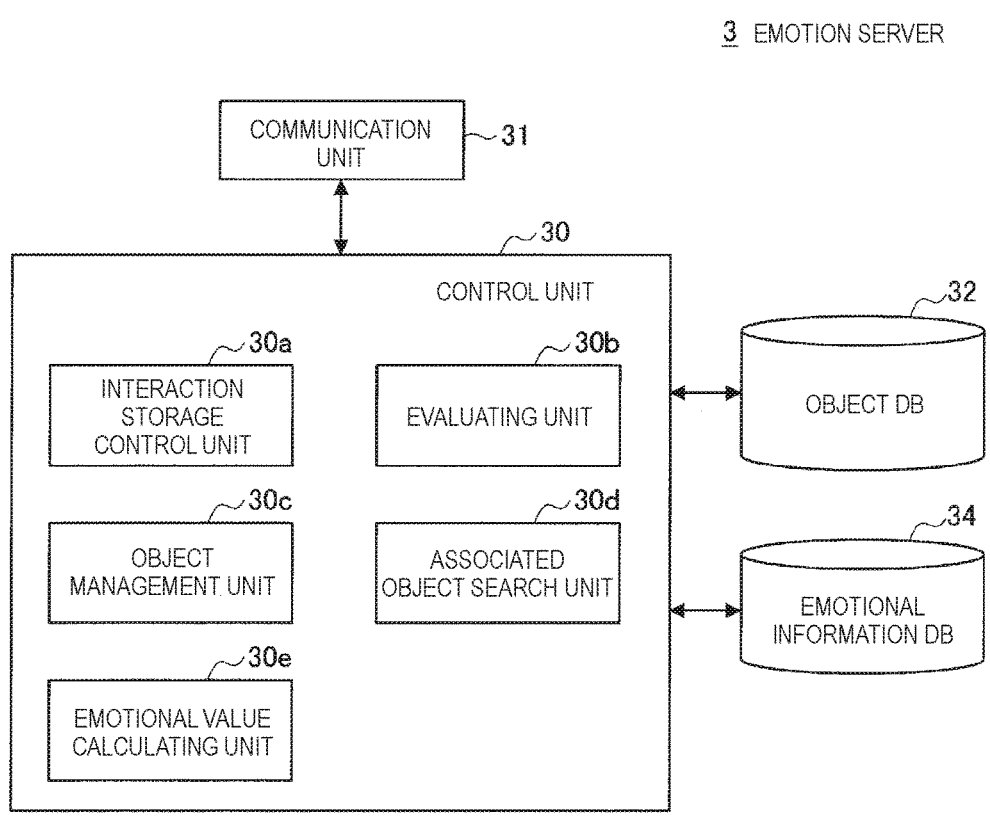
FIG. 5 is a block diagram illustrating an example of a configuration of an emotion server according to the present embodiment.

Next, a configuration of the emotion server 3 according to the present embodiment will be described. FIG. 5 is a block diagram illustrating an example of the configuration of the emotion server 3 according to the present embodiment. As illustrated in FIG. 5, the emotion server 3 includes a control unit 30, a communication unit 31, an object DB 32, and an emotional information DB 34.

(Communication Unit)

The communication unit 31 is connected to the guide server 1 via a network and transmits an emotional value of an object requested from the guide server 1. The communication unit 31 receives interaction information from a sensing device (not illustrated) installed/mounted on each object (including both a person and a thing).

(Control Unit)

The control unit 30 controls the components of the emotion server 3. The control unit 30 is implemented by a microcomputer including a CPU, a ROM, a RAM, and a non-volatile memory. The control unit 30 according to the present embodiment functions as an interaction storage control unit 30a, an evaluating unit 30b, an object management unit 30c, an associated object search unit 30d, and an emotional value calculating unit 30e as illustrated in FIG. 5.

The interaction storage control unit 30a performs control such that the interaction information received from the sensing device installed/mounted on the object is stored in the emotional information DB 34. The sensing device is implemented by a humidity sensor, a temperature sensor, a vibration sensor, an infrared sensor, a camera, a tactile sensor, or a gyro sensor, and detects interactions with objects from other objects. The interactions are actions, and examples of the interactions between persons include a conversation, a telephone call, mail, going out together, and giving of a gift, while examples of the interactions between a person and a thing include handling, storing, cleaning, viewing, and wearing of things.

The evaluating unit 30b evaluates the interaction stored in the emotional information DB 34. A method of evaluating the interaction is not particularly limited, and, for example, the evaluating unit 30b performs the evaluation such that an interaction desirable for an object receiving an interaction is evaluated to be high, specifically, gives a grade of −1.0 to 1.0. The evaluation result is stored in the emotional information DB 34 in association with the interaction.

The object management unit 30c manages registration, modification, deletion, and the like of information related to the object stored in the object DB 32.

The associated object search unit 30d searches for another object that has had an interaction with a requested object ID from the object DB 32 or the emotional information DB 34 as an associated object.

The emotional value calculating unit 30e calculates an emotional value of a target user on the basis of the interaction evaluation associated with the object ID of the target user. For example, the emotional value calculating unit 30e may calculate a total emotional value of the target user on the basis of a total sum of interaction evaluation values or may calculate a total emotional value of the target user on the basis of an average value of interaction evaluation values.

Further, the emotional value calculating unit 30e may calculate the emotional value by using only a predetermined interaction or by weighting a predetermined interaction in accordance with the use purpose of the emotional value in a request source. For example, when the emotional value is used to estimate a relationship of a plurality of users in the guide server 1, the emotional value calculating unit 30e calculates the emotional value using the previous interaction history between designated objects (that is, a plurality of users).

(Object DB)

The object DB 32 is a storage unit that stores the object IDs of the objects. The object DB 32 stores information such as a name, an age, a sex, a service type, a service company, a product name, a product type, a manufacturer ID, a model number, and a manufacturing date and time of an object in association with the object ID.

(Emotional Information DB)

The emotional information DB 34 is a storage unit that stores the interaction information and the evaluation values between objects. Specifically, the emotional information DB 34 stores a date and time and a location at which an interaction is performed, an associated object ID indicating the other party that has had an interaction, an interaction type, the details of an interaction, and interaction evaluation in association with the object ID.

The configuration of the emotion server 3 according to the present embodiment has been described above in detail. The configuration of the emotion server 3 is not limited to the example illustrated in FIG. 5, and for example, the object DB 32 and the emotional information DB 34 may be stored in an external storage device on a network. The emotional value calculating unit 30e of the emotion server 3 may be installed in the guide server 1, and the guide server 1 may calculate the emotional value on the basis of the interaction evaluation between a plurality of users acquired from the emotion server 3.

3. Operation Process

Figure 6:
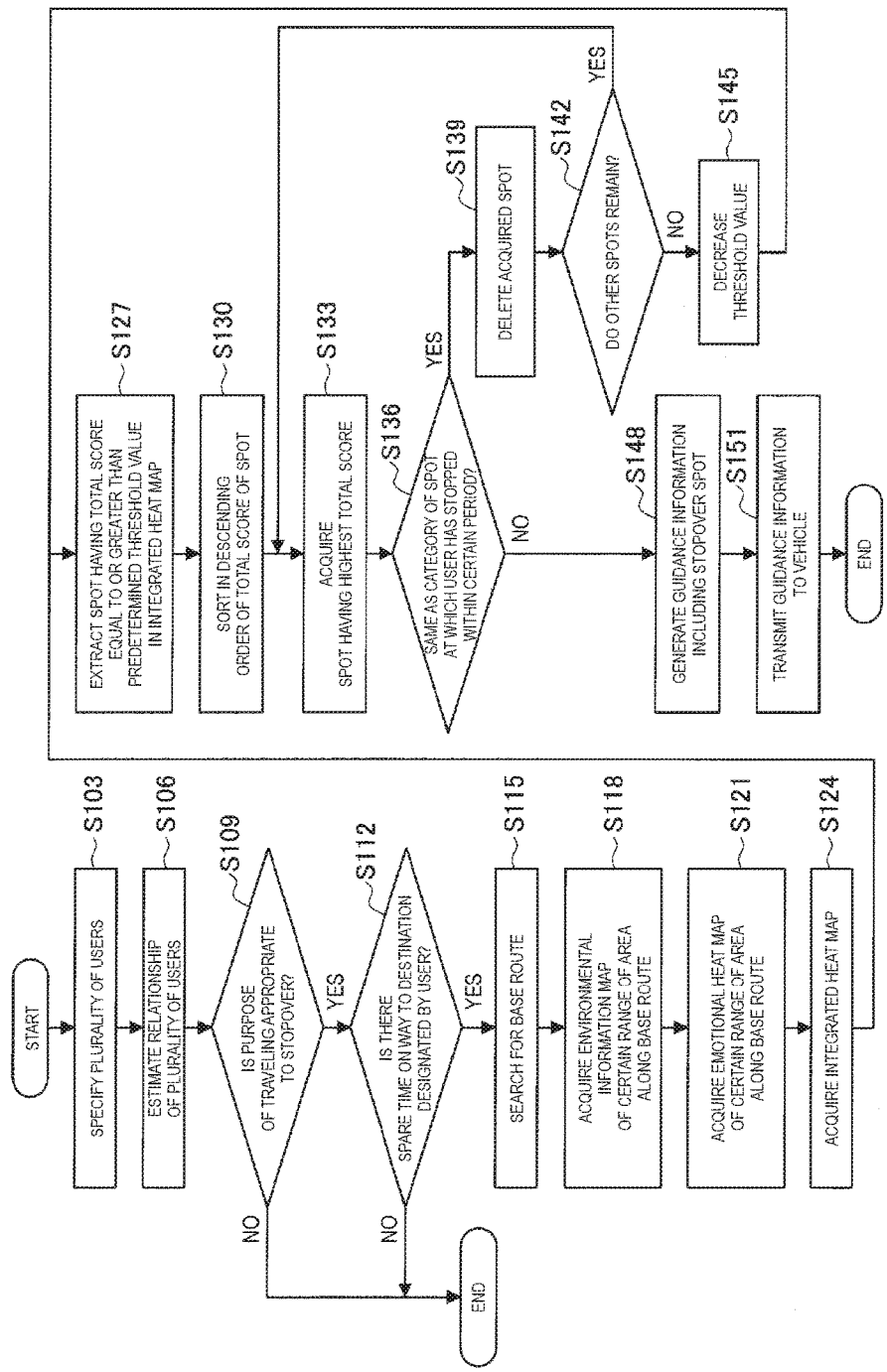
FIG. 6 is a flowchart illustrating a guidance information generation process in the information processing system according to the present embodiment.

Next, an operation process of the information processing system according to the present embodiment will be described with reference to FIG. 6. FIG. 6 is a flowchart illustrating a guidance information generation process in the information processing system according to the present embodiment.

As illustrated in FIG. 6, first, in step S103, the user specifying unit 10a of the guide server 1 specifies a plurality of users riding in the vehicle 2a on the basis of the information related to the passengers which is detected by the sensor and transmitted from the vehicle 2a (specifically, the captured image, the audio data, the biometric information, or the like).

Then, in step S106, the relationship estimating unit 10b estimates a relationship of a plurality of users specified by the user specifying unit 10a. The estimation of a relationship of a plurality of users will be described later in detail with reference to FIG. 13.

Then, in step S109, the guidance information generating unit 10c determines whether or not a purpose of traveling of a plurality of users is appropriate to a stopover. The purpose of traveling of a plurality of users may be estimated from a relationship of the plurality of users, an attribute, a designated destination, or the like. For example, when a relationship of a plurality of users is a parent-child relationship or a sibling relationship, and the destination is a tourist site which is somewhat distant, the guidance information generating unit 10c estimates that the purpose of the travel is a family trip. Further, when a relationship of a plurality of users is a couple relationship, and the destination is a tourist site which is somewhat distant, the guidance information generating unit 10c estimates that the purpose of traveling is a date. Further, when a relationship of a plurality of users is a friend relationship, and the destination is a tourist site which is somewhat distant, the guidance information generating unit 10c estimates that the purpose of traveling is a friend travel. Further, when a relationship of a plurality of users is a business relationship, and the destination is a company or a store, the guidance information generating unit 10c estimates that the purpose of traveling is business. The guidance information generating unit 10c estimates that the purpose of traveling is shopping when the destination is a nearby store such as a commercial facility or a shop, and estimates that the purpose of traveling is dining when the destination is a nearby eating place such as a restaurant or an eating facility. Further, when a relationship of a plurality of users is a family relationship, and the destination is a wedding hall, a funeral hall, or a hospital, the guidance information generating unit 10c estimates that the purpose of traveling is a ceremonial occasion. Further, the guidance information generating unit 10c determines that the purpose of traveling is not appropriate to the stopover spot when the purpose of traveling is "business," "shopping," "ceremonial occasion," or the like, and thus it is required to arrive at the destination early. Further, the guidance information generating unit 10c determines that the purpose of traveling is appropriate to the stopover spot when the purpose of traveling is "family travel," "friend travel," or "date," and thus the trip to the destination should be enjoyable as well. When the user explicitly inputs the purpose of traveling in the vehicle 2a as the navigation setting information, the guidance information generating unit 10c determines whether or not it is appropriate to the stopover on the basis of the input purpose of movement.

Then, when the purpose of traveling is determined not to be appropriate to the stopover ("No" in S109), the process of generating the guidance information including the stopover spot according to the present embodiment ends. In this case, the guidance information generating unit 10c may search for only a base route arriving at the destination in the shortest time/distance and provide the vehicle 2a with the base route found through the search.

On the other hand, when the purpose of traveling is determined to be appropriate to the stopover ("Yes" in S109), in step S112, the guidance information generating unit 10c determines whether or not there is spare time on the way to the destination designated by the user. The spare time on the way to the destination may be calculated based on, for example, a desired destination arrival time input by the user and time taken to travel to the destination. The spare time is spare time for stopping at a stopover spot such as for one hour or more, and a threshold value may be designated by the user.

Then, when it is determined that there is no spare time ("No" in S112), the process of generating the guidance information including the stopover spot according to the present embodiment ends. In this case, the guidance information generating unit 10c may search for only a base route arriving at the destination in the shortest time/distance and provide the vehicle 2a with the base route found through the search. Further, the case in which the process of generating the guidance information including the stopover spot according to the present embodiment ends is not limited to the above example, and for example, it may be determined whether or not the process of generating the guidance information including the stopover spot according to the present embodiment ends in accordance with a situation of the inside of the vehicle detected from the captured image, the audio data, the biometric information, or the like acquired from the vehicle 2a. Specifically, for example, when a situation in which there is a person sleeping or a person in poor health in the vehicle, or it is desired to arrive at a destination early in view of conversational content is detected, the process of generating the guidance information may end. Further, the guidance information generation process may end when the user explicitly inputs information indicating that guidance of the stopover spot is unnecessary.

On the other hand, when it is determined that there is spare time on the way to the destination ("Yes" in S112), the guidance information generating unit 10c searches for the base route from the present location to the destination in step S115. For example, the guidance information generating unit 10c searches for the basic route arriving at the destination in the shortest time/distance in view of conditions input by the user (a fee priority, a general road priority, a distance priority, congestion information, or the like). The process of step S115 may be performed before steps S109 and S112, that is, after step S106.

Then, in step S118, the guidance information generating unit 10c acquires the environmental information map of a certain range of area along the base route found through the search from the environmental information map generating unit 10e. Specifically, the guidance information generating unit 10c gives a designation of a certain range of area along the base route and a filter condition according to a relationship of a plurality of users and an instruction to generate the environmental information map to the environmental information map generating unit 10e. The guidance information generating unit 10c may designate a certain range of area along a base route to pass after a predetermined time from a point of departure. For example, when a child is riding in the vehicle 2a, since the child is expected to become bored one hour after the departure, it is possible to search for a stopover spot near an area to pass one hour after the departure and present the user with the optimal guidance information.

Further, the guidance information generating unit 10c sets a filter condition according to a relationship of a plurality of users, for example, sets "family-oriented" as the filter condition when a relationship of a plurality of users is a "family relationship" and sets "couple-oriented" as the filter condition when a relationship of a plurality of users is a "couple relationship." Accordingly, it is possible to acquire the environmental information map of the designated area from which a suitable spot according to a relationship of a plurality of users can be extracted. Further, the filter conditions designated in the environmental information map generating unit 10*e* are not limited to conditions according to the relationship of a plurality of users, and for example, conditions of an attribute of a plurality of users (an age, a sex, a hobby/preference, an occupation, and the like), a time, and weather may be added. The time condition and the weather conditions are a time at which the user is expected to pass through a designated area or the weather in a designated area (the weather at a current time or the weather at a time at which the user is expected to pass). Further, when a pet is riding in the vehicle 2*a*, a filter condition such as "pets allowed" may be added, and when conversational content such as "I'm hungry" is recognized from a conversation recognition result or when a meal time designated by the user is close, filter conditions such as "restaurant" or "eating facility" may be added.

Figure 7:
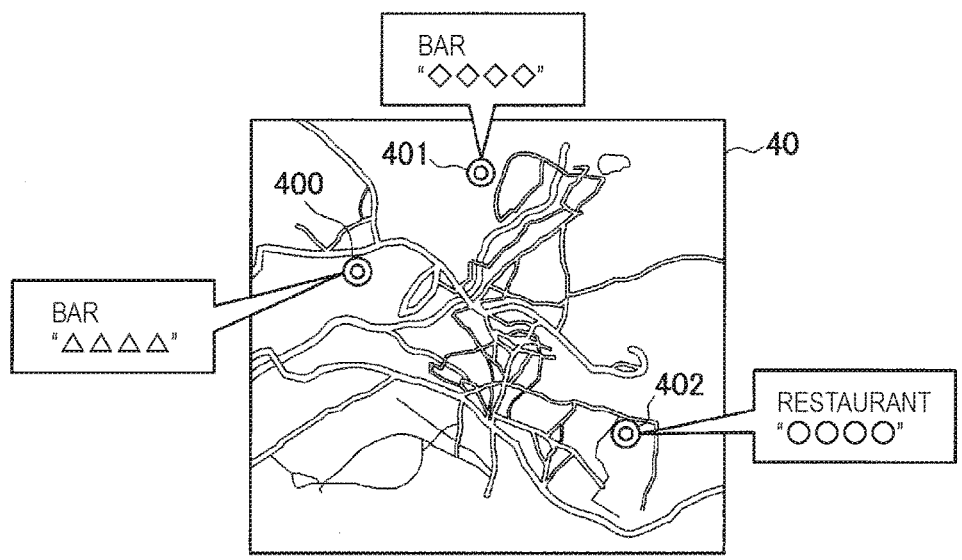
FIG. 7 is a diagram illustrating an example of an environmental information map generated by an environmental information map generating unit according to the present embodiment.

Here, an example of the environmental information map according to the present embodiment is illustrated in FIG. 7. The environmental information map 40 illustrated in FIG. 7 is generated, for example, by filtering on the basis of a filter condition of "couple-oriented" according to a relationship of a plurality of users and a filter condition of a date and time and weather of "rain, temperature of 18 degrees, 9:00 pm." Specifically, the environmental information map generating unit 10*e* acquires information of spots in a designated area (a certain range along a base route) from the spot information server 4, and extracts spots matching a condition such as "couple-oriented" with reference to basic information, feature information, or the like of spots included in the spot information. Further, the environmental information map generating unit 10*e* extracts spots that are open for business during rain in accordance with the condition of "weather: rain." Further, the environmental information map generating unit 10*e* extracts indoor spots in accordance with the condition of "temperature: 18 degrees Celsius" because the outside temperature is cold. Furthermore, the environmental information map generating unit 10*e* extracts stores that are restaurants or bars and open at 9:00 pm or later in accordance with the condition of "time: 9:00 pm." Then, for example, spots 400, 401, and 402 matching the filter condition of "couple-oriented, rain, temperature of 18 degrees, 9:00 pm" are extracted as illustrated in FIG. 7. The environmental information map 40 may be generated by the environmental information map generating unit 10*e* of the guide server 1 as illustrated in FIG. 3 or may be acquired from an external information provision server (not illustrated) via the network.

Then, in step S121, the guidance information generating unit 10*c* acquires the emotional heat map of a certain range of area along the base route found through the search from the emotional heat map generating unit 10*d*. It is possible to detect the emotional value of a person performing an action in each spot or a surrounding area with reference to the emotional heat map. Specifically, the guidance information generating unit 10*c* gives a designation of each spot of a certain range of area along the base route (each spot extracted by the generation of the environmental information map) or a certain range of area and an instruction to generate the emotional heat map to the emotional heat map generating unit 10*d*.

Figure 8:
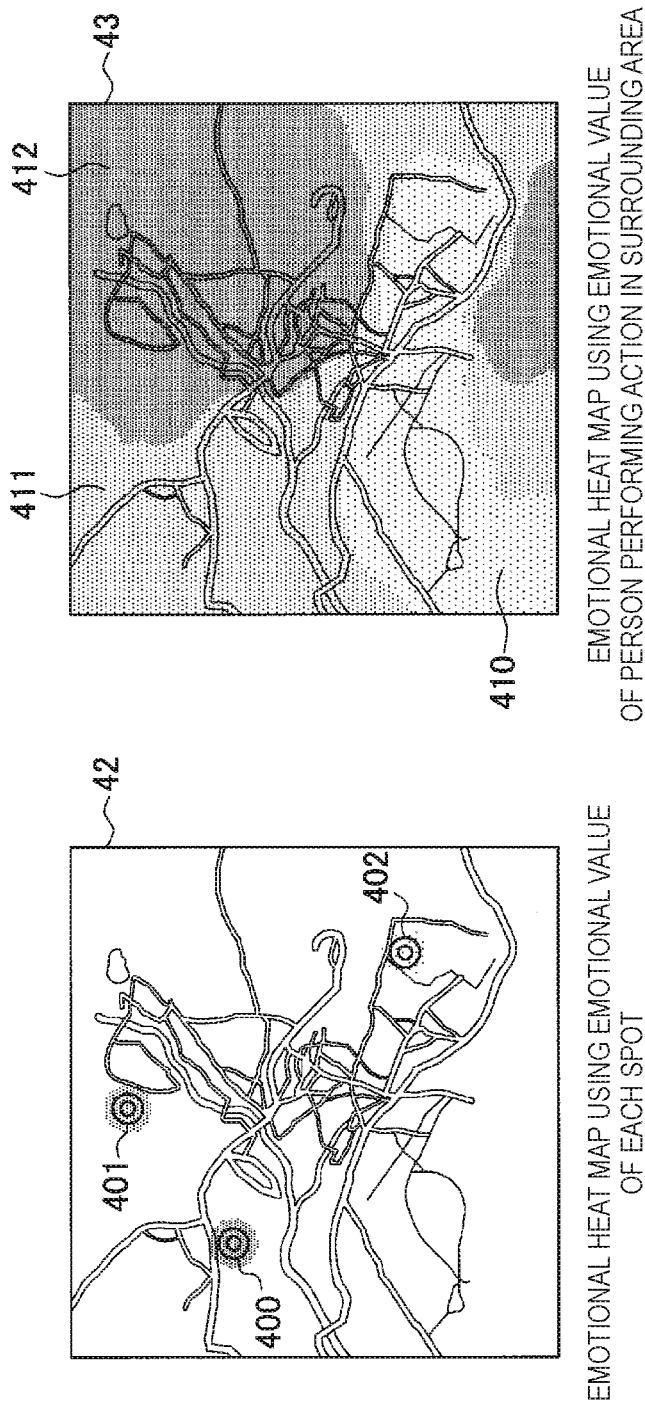
FIG. 8 is a diagram illustrating an example of an emotional heat map generated by an emotional heat map generating unit according to the present embodiment.

Here, an example of the emotional heat map according to the present embodiment is illustrated in FIG. 8. An emotional heat map 42 illustrated on the left of FIG. 8 is generated using the emotional value of each spot in a certain range of area along the base route. The guidance information generating unit 10*c* can select a stopover spot suitable for a plurality of users in accordance with the level of the emotional value of each spot with reference to the emotional heat map 42.

Further, the emotional value of each spot used to generate the emotional heat map 42 may be an emotional value calculated on the basis of an interaction between a person having the same attribute as an attribute of a plurality of users (an age, a sex, an occupation, a hobby/preference, or the like) and a spot. For example, in the emotional heat map 42 illustrated on the left of FIG. 8, an attribute of a plurality of users is, for example, adulthood (age: 20 or older), and the emotional value calculated on the basis of the interaction that has occurred between a person having the same attribute as the attribute of the plurality of users (that is, an adult) and each stop (the stops 400, 401, and 402 extracted by the generation of the environmental information map) is used. Accordingly, it is possible to detect a spot at which a person having an attribute similar to the user to whom the guidance information is provided can stay enjoyably and comfortably in accordance with the level of the emotional value.

The emotional value of each of the spots can be acquired from the emotion server 3. Specifically, the emotional heat map generating unit 10*d* acquires the object ID of each spot (for example, a restaurant "○○○○" and a bar "⌘⌘⌘⌘") from the spot information server 4, transmits the acquired object ID and the attribute information of a plurality of users to the emotion server 3 together, and requests acquisition of the emotional value. On the emotion server 3 side, the emotional value calculating unit 30*e* calculates the emotional value using the previous interaction history on interactions that have occurred between the object ID designated in accordance with the request from the guide server 1 and a person having the designated attribute and transmits the calculated emotional value to the guide server 1.

Specifically, the emotional value calculating unit 30*e* first extracts the object ID of the person having the designated attribute with reference with the detailed object information stored in the object DB 32. An example of the detailed object information is illustrated in FIG. 9. As illustrated in FIG. 9, the detailed object information includes an object ID, an object name (a name, a store name, a product name, or the like), an object type (a person, a restaurant, a bar, or the like), and attribute information (an age, a sex, an occupation, a hobby/preference, a store category, store business hours, a store location, or the like). When the attribute designated from the guide server 1 is "adult (age: 20 or older)," the emotional value calculating unit 30*e* sets a person AAA (object ID: 384), a person BBB (object ID: 465), and a person CCC (object ID: 679) as an object having the corresponding attribute. Then, the emotional value calculating unit 30*e* extracts only information of the previous interaction that has occurred between the extracted object ID of the person and the object ID (an object ID of the spot) requested from the guide server 1 from the emotional information DB 34. Alternatively, the emotional value calculating unit 30*e* may extract previous interaction information generated between a person having a predetermined attribute and a spot by extracting persons who are detected to have had an interaction with the object ID of the spot and extracting a person having a designated attribute among the persons. Further, the guide server 1 side may be provided with a function of searching for a person having a predetermined attribute who has had an interaction with a predetermined spot, and the emotion server 3 side may perform a process of extracting the interaction information between the person designated from the guide server 1 and a predetermined spot. FIG. 10 illustrates an example of the interaction information extracted from the emotional information DB 34. As illustrated in FIG. 10, the evaluation value of the interaction between an object that is a person having a predetermined attribute (here, adult (age: 20 or older) as an example) and an object that is a designated spot (in this case, an action of providing or consuming food/alcohol) is extracted. The emotional value calculating unit 30e calculates the emotional value of each spot on the basis of the extracted interaction information. A method of calculating the emotional value is not particularly limited, and for example, the emotional value may be calculated using an average of the interaction evaluation values, or weighting may be performed in accordance with a date and time at which an interaction has been performed so that influence of the latest interaction is increased.

The emotional heat map generating unit 10d generates the emotional heat map 42 as illustrated on the left in FIG. 8 using the emotional values of each spot described above. In the emotional heat map 42 illustrated on the left in FIG. 8, the emotional values of the spots (the spots 400, 401, and 402) are indicated such that spots having higher emotional values have lighter colors. In other words, the emotional value of the spot 402 is highest, the emotional value of the spot 401 is next highest, and the emotional value of the spot 400 is lowest.

Further, in addition to the emotional heat map 42 using the emotional value of each spot described above, the emotional heat map generating unit 10d according to the present embodiment can also generate an emotional heat map 43 using the emotional value of the person performing an action in a surrounding area as illustrated on the right in FIG. 8. The guidance information generating unit 10c detects an area in which the emotional value is high, that is, an area in which persons having a good background are gathered and an area in which the emotional value is low, that is, an area in which persons having a bad background are gathered with reference to the emotional heat map 43 and selects a stopover spot suitable for a plurality of users.

The emotional heat map 43 illustrated on the right of FIG. 8 is generated using the emotional value calculated on the basis of the interaction evaluation associated with surrounding areas of the base route. Specifically, the emotional heat map generating unit 10d gives a designation of the surrounding area of the base route to the emotion server 3 and requests the emotion server to provide the emotional value. The emotional value calculating unit 30e of the emotion server 3 extracts only the interaction evaluation performed in the designated area from the emotional information DB 34 in accordance with the request from the guide server 1 and calculates the emotional value of the person performing an action in the area. FIG. 11 illustrates an example of the interaction information extracted from the emotional information DB 34. As illustrated in FIG. 11, the interaction information includes an object ID indicating an object that has performed (received) an interaction, a date and time at which the interaction was performed, and an associated object ID indicating an object that has received (performed) an interaction, an interaction type, the details, and an evaluation value. As described above, since the interaction information includes information indicating a location of the interaction, the emotional value calculating unit 30e can extract the information on the interaction performed in the designated area. Further, the emotional value calculating unit 30e calculates an emotional value of a predetermined area (which may be an emotional value of a person performing an action in a predetermined area) on the basis of the evaluation value of the extracted interaction. A method of calculating the emotional value is not particularly limited, and for example, the emotional value may be calculated using an average of the interaction evaluation values. Further, weighting may be performed in accordance with a date and time at which the interaction was performed so that the influence of the latest interaction is increased.

The emotional heat map generating unit 10d generates the emotional heat map 43 illustrated on the right in FIG. 8 using the emotional value of the person performing the action in the predetermined area calculated through the emotional value calculating unit 30e of the emotion server 3. In the emotional heat map 43 illustrated on the right in FIG. 8, the emotional value is indicated such that areas having higher emotional values have lighter colors. In other words, the emotional value of an area 410 is highest, the emotional value of an area 411 is next highest, and the emotional value of an area 412 is lowest.

The generation of the emotional heat map by the emotional heat map generating unit 10d has been described above in detail. The emotional heat map is not limited to one generated by the emotional heat map generating unit 10d of the guide server 1 but may be acquired from an external information provision server (not illustrated) via a network.

Then, referring back to the flowchart illustrated in FIG. 6, in step S124, the guidance information generating unit 10c acquires an integrated heat map in which the environmental information map and the emotional heat map are integrated. The integrated heat map according to the present embodiment will be described with reference to FIG. 12.

Figure 12:
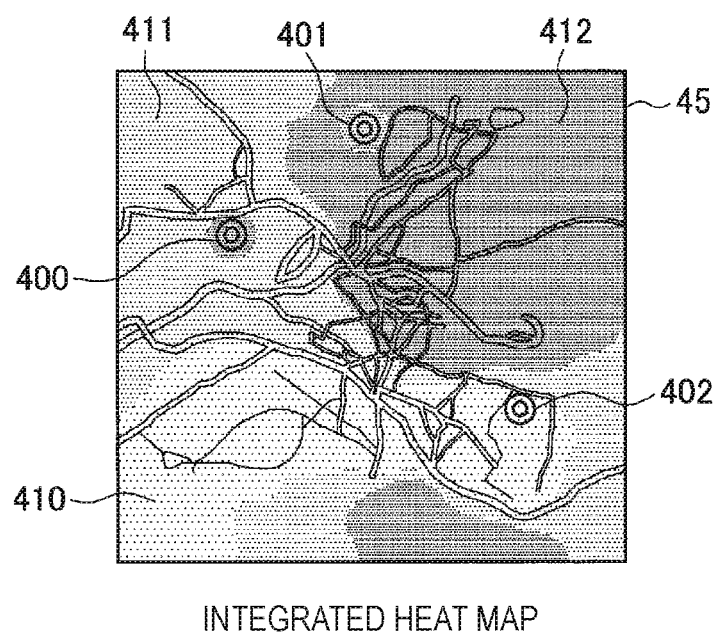
FIG. 12 is a diagram illustrating an example of an integrated heat map according to the present embodiment.

FIG. 12 is a diagram illustrating an example of the integrated heat map according to the present embodiment. An integrated heat map 45 illustrated in FIG. 12 is generated by synthesizing the environmental information map 40 illustrated in FIG. 7, the emotional heat map 42 illustrated on the left of FIG. 8, and the emotional heat map 43 illustrated on the right of FIG. 8. The guidance information generating unit 10c can detect a location of each spot serving as a stopover spot candidate suitable for a relationship of a plurality of users within a certain range along the base route, the level of the emotional value of each spot, and the level of the emotional value of the surrounding area with reference to the integrated heat map 45. For example, in the example illustrated in FIG. 12, the emotional value of the spot 401 among the spots 400, 401, and 402 which are stopover spot candidates suitable for the relationship of a plurality of users is higher than that of the spot 400, but the emotional value of the surrounding area 412 is lower, and thus it is understood that even a store having a good atmosphere, good food, or the like may be bad in public safety. The integrated heat map according to the present embodiment may be generated by synthesizing the emotional heat map 42 with the emotional heat map 43 or may be generated by synthesizing the environmental information map 40 with the emotional heat map 42 or the emotional heat map 43.

Then, in step S127, the guidance information generating unit 10c extracts a spot having a total score equal to or greater than a predetermined threshold value in the integrated heat map. For example, the total score of the spot is calculated on the basis of the emotional value of the spot indicated in the emotional heat map 42 and the emotional value of the surrounding area of the stop indicated in the emotional heat map 43 as it matches the filter condition used at the time of generating the environmental information map 40. Specifically, for example, the total score of the spot 401 of the integrated heat map 45 illustrated in FIG. 12 is calculated by considering that the emotional value of the surrounding area 412 is low in addition to the emotional value of the spot.

Then, in step S130, the guidance information generating unit 10c generates a stopover spot candidate list by sorting the spots in descending order of the total scores of the spots.

Then, in step S133, the guidance information generating unit 10c acquires the spot having the highest total score in the generated list of the stopover spot candidates.

Then, in step S136, the guidance information generating unit 10c determines whether or not the category of the acquired spot is the same as a category of a stop at which a plurality of users have stopped within a certain period (a restaurant, a bar, a zoo, or the like). The category of the spot can be acquired from the spot information server 4.

Then, when the category of the acquired spot is the same as a category of a stop at which a plurality of users have stopped within a certain period ("Yes" in S136), in step S139, the guidance information generating unit 10c deletes the acquired spot from the stopover spot candidate list.

Then, in step S142, the guidance information generating unit 10c determines whether or not other spots remain in the stopover spot candidate list.

Then, when other spots remain ("Yes" in S142), the process returns to S133, and the spot having the highest total score is acquired again from the list of the remaining stopover spot candidates. Accordingly, it is possible to prevent the user from being guided to a spot of the same category as the spot at which the user has stopped within a certain period again.

On the other hand, when no other spots remain ("No" in S142), in step S145, the guidance information generating unit 10c decreases the predetermined threshold value for extracting the spot by a predetermined value, and then the process returns to S127, and the spot is extracted using a new threshold value.

When the category of the acquired spot is not the same as the category of the stop at which the user has stopped within a certain period ("Yes" in S136), in step S148, the guidance information generating unit 10c generates the guidance information in which the acquired spot is set as a stopover spot. Specifically, the guidance information generating unit 10c generates the guidance information for providing guidance on a route to arrive at the destination via the stopover spot. Alternatively, the guidance information generating unit 10c may generate guidance information for presenting the detail information of the stopover spot and allowing the user to select whether or not the route is changed or may generate guidance information of presenting a plurality of spots as the stopover spot candidates and allowing the user to select the stopover spot. Further, when the desired destination arrival time is designated by the user, the guidance information generating unit 10c may generate guidance information including a maximum stay time at the stopover spot obtained from a remaining time and a traveling time.

Then, in step S151, the guide server 1 transmits the generated guidance information to the vehicle 2a. In the vehicle 2a, the guidance information is displayed on the display unit 26 or output from the speaker (not illustrated) in a voice output manner. The vehicle 2a may notify the user of the information related to the spot through audio or video when the user travels near a sightseeing spot or a spot of interest even if the user does not stop at the stopover spot. Further, when the vehicle 2a is an autonomous cruising vehicle, autonomous cruising according to the guidance information (the information of the route to the destination via the stopover spot) may be performed.

The process of generating the guidance information including the stopover spot according to the present embodiment has been described above. Next, the process of estimating a relationship of a plurality of users described in S106 will be described in detail with reference to FIG. 13.

Figure 13:
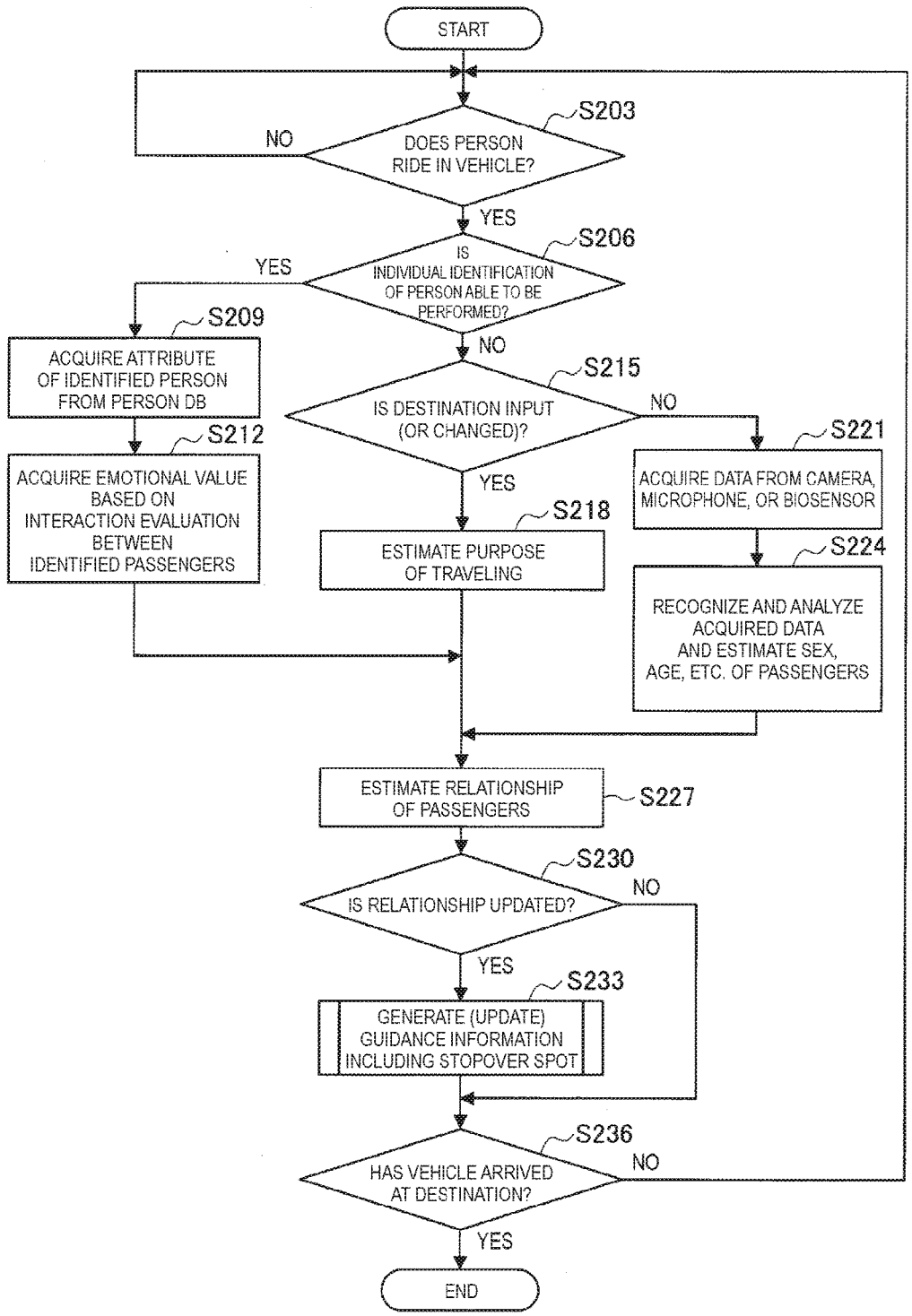
FIG. 13 is a flowchart illustrating the details of a process of estimating a relationship of a plurality of users according to the present embodiment.

FIG. 13 is a flowchart illustrating the details of the process of estimating a relationship of a plurality of users according to the present embodiment. As illustrated in FIG. 13, first, in step S203, the user specifying unit 10a of the guide server 1 determines whether or not a person rides in the vehicle 2a. Specifically, the face of the person who rides in the vehicle 2a is photographed by the in-vehicle camera 23 of the vehicle 2a, and the captured image is transmitted from the vehicle 2a, and thus the user specifying unit 10a determines whether or not a person rides in the vehicle through the face recognition based on the captured image. Further, the user specifying unit 10a can also determine whether or not a person rides in the vehicle on the basis of analysis of the audio data or the biometric information of the passenger transmitted from the vehicle 2a in addition to the captured image transmitted from the vehicle 2a.

Then, when a person rides in the vehicle 2a ("Yes" in S203), in step S208, the user specifying unit 10a performs the individual identification of the person. Specifically, the user specifying unit 10a performs the individual identification of the passenger with reference to the analysis result of the captured facial image and the person information previously registered in the person DB server 6. Alternatively, the user specifying unit 10a can perform the individual identification with reference to a voice recognition result of the passenger, an analysis result of the biometric information, and the person information registered in the person DB server 6.

Then, when the individual identification of the passenger is able to be performed ("Yes" in S206), in step S209, the relationship estimating unit 10b acquires the attribute of the identified person from the person DB server 6. Examples of the attribute of the person registered in the person DB server 6 include an age, a sex, an occupation, a hobby/preference, an object ID, and the like.

Then, in step S212, the relationship estimating unit 10b acquires the emotional value based on the interaction evaluation between the identified passengers (between a plurality of users) from the emotion server 3.

On the other hand, when the individual identification of the passenger is unable to be performed ("No" in S206), in step S215, the relationship estimating unit 10b determines whether or not the destination is input (or changed) by the passenger.

Then, when the destination is input ("Yes" in S215), in step S218, the relationship estimating unit 10b estimates the purpose of traveling of the passenger. For example, the purpose of traveling of the passenger is estimated to be "leisure" when it is a sightseeing spot, "business" when it is a place related to a company or a business, "shopping" when it is a supermarket or a store, and "fun/errand" when it is an individual's home such as a condominium or an apartment. The relationship estimating unit 10b can further increase the estimation accuracy of the purpose of traveling with reference to a day of the week and a time.

On the other hand, when no destination is input ("No" in S215), in step S221, the user specifying unit 10a acquires the information related to the user detected by the in-vehicle camera 23, the microphone 24, the biosensor 27, or the like of the vehicle 2a (the captured image, the audio data, the biometric information, or the like).

Then, in step S224, the user specifying unit 10a can specify a sex and an age of the passenger even when the individual identification is unable to be performed through the face recognition, the voice analysis, and the biometric information analysis using the information related to the acquired user. Further, when a depth sensor (not illustrated) is installed in the vehicle 2a, it is possible to acquire body shape data of the passenger using a sensor value detected through the depth sensor and increase the estimation accuracy of a sex or an age.

Then, in step S227, the relationship estimating unit 10b estimates a relationship of a plurality of users riding in the vehicle 2a using the emotional value based on the attribute of the person or the interaction evaluation between a plurality of users when the individual identification is able to be performed, and estimates a relationship of a plurality of users riding in the vehicle 2a using the estimated purpose of traveling or a sex/age of the passenger when the individual identification is unable to be performed.

For example, a case in which a person sitting in the driver seat is identified to be a person registered in advance as the owner of the vehicle through the individual identification, the attributes of the person "28 years old and male" are acquired, and a person is estimated to be a female in her 20's through the face recognition although the individual identification of the person sitting in the passenger seat is unable to be performed is considered. In this case, the relationship estimating unit 10b narrows a relationship of a plurality of users down to candidates such as a couple, friends, a boss and subordinate of a company, and family. Further, the relationship estimating unit 10b can estimate a couple relationship when they are headed for a sightseeing site on holiday and a business relationship when they are headed for a business-related place on a weekday in view of a date and time, a destination, the purpose of traveling, or the like. The relationship estimating unit 10b may estimate a relationship of a plurality of users in view of the conversational content recognized from the audio data.

Further, the estimation of a relationship of a plurality of users is not limited to one using the attribute, the emotional value, the purpose of traveling, or a sex/age, and for example, the estimation of a relationship of a plurality of users may be performed on the basis of conversational content based on data detected by a camera, a microphone, a biosensor, a voice tone, the atmosphere inside the vehicle, or a degree of closeness.

Then, in step S230, the guidance information generating unit 10c determines whether or not the relationship is updated. The estimation of a relationship of a plurality of users riding in the vehicle 2a is continuously performed, and a relationship of a plurality of users is estimated when a new person boards, when the destination is changed, when the atmosphere inside the vehicle changes, or the like. When the relationship estimating unit 10b newly estimates a relationship of a plurality of users, the guidance information generating unit 10c determines that the relationship has been updated.

Then, when the relationship is updated ("Yes" in S230), in step S233, the guidance information generating unit 10c generates (updates) the guidance information including the stopover spot. In the guidance information generation process, the process of S109 to S151 in FIG. 6 is mainly performed.

Then, in step S236, the guide server 1 determines whether or not the vehicle 2a has arrived at the destination, and the process of S203 to S233 is repeated until the vehicle 2a arrives at the destination.

A more specific process of estimating a relationship of a plurality of users according to the present embodiment has been described above. The present embodiment is not limited to the process described above, and for example, since the user does not desire to stop when traveling for business, a "stopover permission mode" is prepared in advance, and the control unit 10 of the guide server 1 may perform the guidance information generation process according to the present embodiment when the user selects the mode.

Further, the control unit 10 of the guide server 1 determines whether or not the user has actually stopped at a stopover spot to which he or she was guided, and when the user has actually stopped at the stopover spot to which he or she was guided, the control unit 10 of the guide server 1 determines whether or not the estimated relationship or the selection of the stopover spot to which the user was guided is correct on the basis of a stay time, a degree of smiling after returning to the vehicle 2a, a change in a conversation amount, or the like. Further, when it is necessary to re-estimate a relationship in accordance with a result thereof, the relationship estimating unit 10b re-estimates a relationship of a plurality of users.

Further, when the individual identification is able to be performed, the guidance information generating unit 10c is able to detect hobbies/preferences or personalities of individuals on the basis of a history of an SNS or content of mail and suggest a more optimal stopover spot. Specifically, the guidance information generating unit 10c provides a filter condition in which hobbies/preferences or personalities of individuals are reflected when an instruction to generate the environmental information map is given to the environmental information map generating unit 10e.

Further, since it is possible to acquire the emotional value based on the previous interaction between the passengers from the emotion server 3 and estimate a more detailed relationship (such as "couple is bickering"), it is possible to select the stopover spot using a detailed relationship. For example, when a relationship such as "couple is bickering" is estimated, since places providing extraordinary experiences such as amusement parks are better for reconciliation, the guidance information generating unit 10c provides a filter condition of "extraordinary experiences" when an instruction to generate the environmental information map is given to the environmental information map generating unit 10e.

4. Conclusion

As described above, in the information processing system according to the embodiment of the present disclosure, it is possible to generate more optimal guidance information in view of a relationship of a plurality of users. Specifically, in the information processing system of the present embodiment, a spot (stopover spot) near a base route to a destination is extracted in accordance with a relationship of a plurality of users, and guidance information including a stopover spot is generated.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to create a computer program causing hardware such as a CPU, a ROM, and a RAM installed in the guide server 1, the vehicle 2*a*, the smartphone 2*b*, or the emotion server 3 to perform the function of the guide server 1, the vehicle 2*a*, the smartphone 2*b*, or the emotion server 3. Further, a computer readable storage medium having the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system, including:

a user specifying unit configured to specify a plurality of users who are performing an action together;

an estimating unit configured to estimate a relationship of the plurality of specified users; and a generating unit configured to generate guidance information for the plurality of users in accordance with the estimated relationship of the plurality of users.

(2)

The information processing system according to (1), in which the user specifying unit specifies the plurality of users who are performing an action together on the basis of information related to the users detected by a sensor.

(3)

The information processing system according to (1) or (2), in which the estimating unit estimates the relationship of the plurality of users in accordance with a sex or an age of each of the users acquired on the basis of information related to the users detected by a sensor.

(4)

The information processing system according to any one of (1) to (3), in which the estimating unit estimates the relationship of the plurality of users in accordance with an atmosphere acquired on the basis of information related to the users detected by a sensor.

(5)

The information processing system according to any one of (2) to (4), in which the information related to the users detected by the sensor is at least one of a captured image, audio data, biometric information, and inter-terminal communication data.

(6)

The information processing system according to any one of (1) to (5), in which the estimating unit estimates the relationship of the plurality of users in accordance with information related to an emotion of the users.

(7)

The information processing system according to (6), in which the information related to the emotion of the users is generated on the basis of information related to the users detected by a sensor.

(8)

The information processing system according to (7), in which the information related to the emotion of the users is generated using at least one of facial expression analysis based on facial images of faces of the users, analysis of conversational content based on audio data, a voice tone, and a heart rate, a perspiration amount, brain waves, or a body motion based on biometric information.

(9)

The information processing system according to (6), in which the estimating unit acquires, as the information related to the emotion of the users, an emotional value calculated on the basis of an interaction evaluation value between objects corresponding to the plurality of users from an emotional value database constructed by accumulating evaluation values of interactions between objects, and estimates the relationship of the plurality of users on the basis of the emotional value.

(10)

The information processing system according to any one of (1) to (9), in which the estimating unit estimates the relationship of the plurality of users in accordance with an attribute of the plurality of users.

(11)

The information processing system according to any one of (1) to (10), in which the generating unit decides a stopover spot to be included in the guidance information in accordance with the relationship of the plurality of users estimated by the estimating unit.

(12)

The information processing system according to any one of (1) to (9), in which the generating unit generates the guidance information using an emotional heat map in which information related to an emotion is associated with a position in a map form.

(13)

The information processing system according to (12), in which the generating unit generates the guidance information using an environmental information map in which information related to an environment is associated with a position in a map form and the emotional heat map.

(14)

The information processing system according to (13), in which the information related to the environment is spot information.

(15)

The information processing system according to any one of (1) to (14), further including a transmitting unit configured to transmit the generated guidance information to an autonomous cruising vehicle, in which the autonomous cruising vehicle performs autonomous cruising control in accordance with information of a route to a destination as the guidance information.

(16)

The information processing system according to (15), in which the information of the route includes a stopover spot on the way to a destination.

(17)

The information processing system according to any one of (1) to (16), further including a transmitting unit configured to transmit the generated guidance information to an information processing terminal, in which the information processing terminal presents the guidance information to the user.

(18)

A control method, including:

specifying, by a specifying unit, a plurality of users who are performing an action together;

estimating, by an estimating unit, a relationship of the plurality of specified users; and generating, by a generating unit, guidance information for the plurality of users in accordance with the estimated relationship of the plurality of users.

REFERENCE SIGNS LIST 1 guide server
10 control unit
10a user specifying unit
10b relationship estimating unit
10c guidance information generating unit
10d emotional heat map generating unit
10e environmental information map generating unit
11 communication unit
12 storage unit
2a vehicle
20 control unit
21 communication unit
22 vehicle position acquiring unit
23 in-vehicle camera
24 microphone
25 operation input unit
26 display unit
27 biosensor
28 autonomous cruising control unit
29 storage unit
2b smartphone
3 emotion server
4 spot information server
5 SNS server
6 person DB server
7 Internet
40 environmental information map
42, 43 emotional heat map
45 integrated heat map
400 to 402 spot

The invention claimed is:

1. An information processing system, comprising:
circuitry configured to:
 detect a plurality of users traveling together;
 acquire at least one of audio data associated with the plurality of users, or visual data associated with the plurality of users;
 determine first information that indicates a relationship of the plurality of users, based on at least one of the audio data or the visual data;
 generate guidance information that indicates geographical information of at least one stopover spot that is different from a destination, wherein the at least one stopover spot is within proximity of a specific route to the destination, and wherein the guidance information is generated based on the first information; and
 output the guidance information to the plurality of users.

2. The information processing system according to claim 1, wherein the circuitry is further configured to:
 acquire user information associated with the plurality of users from a sensor; and
 detect the plurality of users traveling together based on the user information.

3. The information processing system according to claim 1, wherein the circuitry is further configured to:
 acquire user information associated with the plurality of users, wherein the user information indicates at least one of sex of each user of the plurality of users or age of each user of the plurality of users; and
 determine the first information based on the user information.

4. The information processing system according to claim 1, wherein the circuitry is further configured to:
 acquire atmospheric information of surroundings of the plurality of users; and
 determine the first information based on the atmospheric information.

5. The information processing system according to claim 2, wherein the user information associated with the plurality of users is at least one of a captured image, the audio data, biometric information, or inter-terminal communication data.

6. The information processing system according to claim 1, wherein the circuitry is further configured to:
 determine second information that indicates an emotion of at least one user of the plurality of users, based on the visual data; and
 determine the first information based on the second information.

7. The information processing system according to claim 6, wherein the circuitry is further configured to:
 acquire user information of the plurality of users; and
 determine the second information based on the user information.

8. The information processing system according to claim 7, wherein the user information indicates at least one of facial expression analysis, analysis of conversational content, a perspiration amount based on biometric information, brain waves based on the biometric information, or a body motion based on the biometric information.

9. The information processing system according to claim 6, wherein the circuitry is further configured to:
 acquire an emotional value from an emotional value database, wherein the emotional value is calculated based on an evaluation value of a plurality of evaluation values,
  wherein the emotional value is information associated with the emotion of the plurality of users,
  wherein the emotional value database includes the plurality of evaluation values,
  wherein the plurality of evaluation values is associated with a plurality of past interactions among a plurality of objects, and
  wherein the plurality of objects corresponds to the plurality of users; and
 determine the first information that indicates the relationship of the plurality of users, based on the emotional value.

10. The information processing system according to claim 1, wherein the circuitry is further configured to determine the first information based on an attribute of the plurality of users.

11. The information processing system according to claim 1, wherein the circuitry is further configured to generate the guidance information based on an emotional heat map, and
 wherein, in the emotional heat map, third information related to an emotion of at least one user of the plurality of users is associated with a position in a map form.

12. The information processing system according to claim 1, wherein the circuitry is further configured to generate the guidance information based on an environmental information map, and
 wherein, in the environmental information map, fourth information related to an environment is associated with a position in a map form.

13. The information processing system according to claim 12, wherein the fourth information related to the environment is stopover spot information.

14. The information processing system according to claim 1, wherein the circuitry is further configured to transmit the guidance information to an autonomous cruising vehicle, and
   wherein the autonomous cruising vehicle controls autonomous cruising control based on fifth information, of the specific route to the destination, as the guidance information.

15. The information processing system according to claim 1, wherein the circuitry is further configured to transmit the guidance information to an information processing terminal, and
   wherein the information processing terminal is configured to present the guidance information to a user of the plurality of users.

16. A control method, comprising:
detecting a plurality of users traveling together;
acquiring at least one of audio data associated with the plurality of users or visual data associated with the plurality of users;
determining information that indicates a relationship of the plurality of users, based on at least one of the audio data or the visual data;
generating guidance information that indicates geographical information of at least one stopover spot that is different from a destination, wherein the at least one stopover spot is within proximity of a specific route to the destination, and wherein the guidance information is generated based on the information; and
outputting the guidance information to the plurality of users.

* * * * *